US011981229B2

United States Patent
Jelinek et al.

(10) Patent No.: US 11,981,229 B2
(45) Date of Patent: May 14, 2024

(54) ON-BOARD NETWORK FOR A MOTOR VEHICLE, MOTOR VEHICLE, AND METHOD FOR OPERATING AN ON-BOARD NETWORK

(71) Applicant: AUDI AG, Ingolstadt (DE)

(72) Inventors: Karl Jelinek, Kösching (DE); Christian Lippert, Ingolstadt (DE); Stefan Schoberer, Mindelstetten (DE)

(73) Assignee: AUDI AG, Ingolstadt (DE)

( * ) Notice: Subject to any disclaimer, the term of this patent is extended or adjusted under 35 U.S.C. 154(b) by 145 days.

(21) Appl. No.: 17/521,963

(22) Filed: Nov. 9, 2021

(65) Prior Publication Data
US 2022/0234465 A1     Jul. 28, 2022

(30) Foreign Application Priority Data
Jan. 26, 2021   (DE) .................... 102021101600.2

(51) Int. Cl.
*B60L 53/63*     (2019.01)
*B60L 53/10*     (2019.01)
(Continued)

(52) U.S. Cl.
CPC .............. *B60L 58/20* (2019.02); *B60L 53/11* (2019.02); *B60L 53/57* (2019.02); *B60L 53/63* (2019.02); *B60L 58/18* (2019.02)

(58) Field of Classification Search
CPC .......... B60L 58/20; B60L 58/18; B60L 53/11; B60L 53/57; B60L 53/63; B60L 50/60; B60L 1/00
See application file for complete search history.

(56) References Cited

U.S. PATENT DOCUMENTS 8,183,804 B2 * 5/2012 Iwahori ................... B60L 50/13
                                                318/148
9,956,931 B2 * 5/2018 Janarthanam ............ B60K 6/48
(Continued)

FOREIGN PATENT DOCUMENTS

CN      103023105 A  *  4/2013
CN      103795130 A  *  5/2014
(Continued)

OTHER PUBLICATIONS

German Examination Report dated Aug. 23, 2021 in corresponding German Application No. 102021101600.2; 20 pages; Machine translation attached.

*Primary Examiner* — Stacy Whitmore
(74) *Attorney, Agent, or Firm* — Maier & Maier, PLLC

(57) ABSTRACT

An on-board network for a motor vehicle including a control device, an energy storage device, and multiple components operable via the energy storage device. The on-board network is divided into at least two sub-networks and the sub-networks each include at least one of the components. The components of different sub-networks are each assigned to at least one different operating state of the motor vehicle. Each of the sub-networks can be separated from the energy storage device via at least one switching device and the control device is configured to activate the switching devices as a function of operating state information which describes at least one present operating state of the motor vehicle.

12 Claims, 2 Drawing Sheets

(51) Int. Cl.
  *B60L 53/57* (2019.01)
  *B60L 58/18* (2019.01)
  *B60L 58/20* (2019.01)

(56) References Cited

U.S. PATENT DOCUMENTS

| | | | | |
|---|---|---|---|---|
| 10,384,628 | B2 * | 8/2019 | Mohrmann | H02J 1/102 |
| 11,318,855 | B2 * | 5/2022 | Straßer | B60K 1/00 |
| 2019/0283611 | A1 * | 9/2019 | Conlon | H02J 3/322 |
| 2020/0044464 | A1 * | 2/2020 | Sasu | B60L 53/53 |
| 2021/0170885 | A1 * | 6/2021 | Slepchenkov | H02J 7/0048 |

FOREIGN PATENT DOCUMENTS

| | | | | |
|---|---|---|---|---|
| CN | 104853949 | A * | 8/2015 | ............... B60L 1/08 |
| CN | 114906333 | A * | 8/2022 | |
| DE | 102012206932 | A1 | 10/2013 | |
| DE | 102014201345 | A1 | 7/2015 | |
| DE | 102017008840 | A1 * | 3/2018 | |
| DE | 102018202590 | A1 | 8/2019 | |
| DE | 102018203039 | A1 | 9/2019 | |
| DE | 102019207601 | A1 * | 11/2019 | ........... B60K 17/356 |
| DE | 102019003458 | A1 * | 1/2020 | ............. B60L 53/14 |
| DE | 102018217255 | A1 * | 4/2020 | |
| DE | 102019005732 | A1 * | 4/2020 | |
| DE | 102019007030 | A1 | 7/2020 | |
| DE | 102019129785 | A1 | 5/2021 | |
| DE | 102020006443 | A1 * | 4/2022 | |
| DE | 102021101600 | A1 * | 7/2022 | ............. B60L 53/11 |
| DE | 102021101601 | A1 * | 7/2022 | |
| JP | 7189751 | B2 * | 12/2022 | ............. B60K 6/442 |
| KR | 20160021444 | A * | 2/2016 | |
| KR | 20180058587 | A * | 6/2018 | |
| WO | WO 2021122236 | A1 * | 6/2021 | |
| WO | WO-2021122236 | A1 * | 6/2021 | ............. B60L 1/003 |

* cited by examiner

ON-BOARD NETWORK FOR A MOTOR VEHICLE, MOTOR VEHICLE, AND METHOD FOR OPERATING AN ON-BOARD NETWORK

FIELD

The invention relates to an on-board network for a motor vehicle comprising a control device, an energy storage device, and multiple components operable via the energy storage device, wherein the on-board network is divided into at least two sub-networks and the sub-networks each comprise at least one of the components. The invention also relates to a motor vehicle and a method for operating an on-board network.

BACKGROUND

On-board networks of motor vehicles, in particular of electric vehicles having an electric traction motor, are usually constructed in such a way that an energy storage device connected to the on-board network, for example a traction battery, can be separated from the other components of the on-board network or from a high-voltage system of the motor vehicle via switching devices, also known as main separating elements. All of the components integrated in the on-board network, which is designed as a high-voltage on-board network, for example, can thus be separated from the energy storage device by opening the main separating elements.

When the main separating elements are closed, the components can accordingly be supplied via the energy storage device, that is, the on-board network is active and the voltage from the energy storage device is applied to all components. In the case of an active on-board network, the voltage of the energy storage device is therefore also applied to components, the function of which is presently not required when operating a motor vehicle that includes the on-board network. This has the disadvantage that the components are permanently loaded by the voltage of the energy storage device, although their function is only required temporarily and not permanently. Various types of motor vehicle on-board networks are known from the prior art.

DE 10 2012 206 932 A1 describes a motor vehicle on-board network having at least two sub-networks which are connected to one another by means of a DC voltage converter and a bridging switch. In this case, a consumer having at least two different power requirements is connected in a first of the sub-networks and the motor vehicle on-board network is configured to supply a voltage in a first operating mode with the bypass switch open only via the DC voltage converter when a first power requirement of the at least one consumer is present and when a second, higher power requirement of the at least one consumer is present, in a second operating mode with the bypass switch closed to feed power via the bridging switch from the second sub-network into the first sub-network.

A switching device for a high-voltage on-board network of a motor vehicle, which has at least two sub-networks, is known from DE 10 2018 202 590 A1. The switching device comprises at least one current measuring unit, a switching element, and a control unit, wherein the switching device is designed to safely disconnect a high-voltage battery from other high-voltage consumers in the event of a short circuit in the high-voltage on-board network.

DE 10 2014 201 345 A1 discloses an on-board network for a vehicle having a low-voltage sub-network for at least one low-voltage consumer and having a high-voltage sub-network for at least one high-voltage consumer and an electrical generator. In this case, the high-voltage sub-network also comprises a battery which is configured to generate a high voltage and output it to the high-voltage sub-network. The low-voltage sub-network is connected to the energy storage device via a coupling unit, which can selectively connect battery units of the energy storage device to the low-voltage sub-network. As a result, the battery units of the energy storage device can have the most equal possible state of charge.

SUMMARY

The invention is based on the object of specifying an improved on-board network for a motor vehicle which, in particular, reduces the loads on components of the on-board network that are not required.

To achieve this object, in an on-board network of the type mentioned, it is provided according to the invention that the components of different sub-networks are each assigned to at least one different operating state of the motor vehicle, wherein each of the sub-networks can be separated from the energy storage device via at least one switching device and the control device is configured to activate the switching devices as a function of operating state information that describes at least one present operating state of the motor vehicle in such a way that the sub-networks, which comprise a component assigned to the present operating state, are each connected to the energy storage device, and the sub-networks, which do not comprise a component assigned to the present operating state, are separated from the energy storage device.

This advantageously makes it possible for only those components to be connected to the energy storage device which are actually required in the present operating state of the motor vehicle. Components that are not required in the present operating state can be separated from the energy storage device by the switching devices, so that only those components are connected to the energy storage device which are also used in the present operating state of the motor vehicle. Dividing the components into different sub-networks makes it possible to connect individual components or groups of components, which are operated in a certain operating state of the motor vehicle, individually or as a group to the energy storage device via the respective switching device assigned to the sub-network. As a result, the operating hours of the individual components can advantageously be reduced, since these are generally not used in all operating states of the motor vehicle, that is to say not permanently.

Furthermore, the on-board network according to the invention has the advantage that by disconnecting the components or the respective sub-networks by way of the switching devices from the energy storage device, a lower load, in particular on an input circuit of the respective components can result, since the components arranged in the sub-networks are not permanently connected to the energy storage device. In particular, it is possible for each of the components to be completely or at least partially de-energized by disconnecting the respective sub-network. Furthermore, the respective components or individual circuit parts of the respective components in the disconnected sub-networks do not have any feedback on the part of the on-board network that is in operation.

The total capacitance, which is available, for example, for filter capacitors such as Y capacitors in the filter devices of the components, can be limited in the on-board network of a motor vehicle for safety reasons. This total capacitance is to be divided among all components connected to the energy storage device in the vehicle. Achieving the desired filter property of a filter device of the components designed, for example, as an EMC filter (EMC=electromagnetic compatibility), can therefore require the use of additional inductances in the filter device, in consideration of the permissible total capacitance. These inductances, however, require more installation space than comparable capacitances and are also usually more expensive and heavier.

By dividing the components into two or more sub-networks that can be separately switched on or off, the effect can be used that, depending on the operating state of the motor vehicle, certain combinations of components are not in operation at the same time. By excluding certain combinations of the components connected to the energy storage device, the total budget of capacitance for Y-capacitors can be divided among a smaller maximal number of components that can be operated at the same time, so that to achieve the desired filter effect in the filter devices of the components, larger capacitances and thus smaller inductances can be used. This advantageously enables a cost-reduced, space-reduced, and weight-reduced design of filter devices in the components.

The components connected to the energy storage device in the at least two sub-networks via the switching devices can thus each have a filter device, each having at least one Y-capacitor. Since a permissible total capacitance for the Y-capacitors in the on-board network extends only to the subset of the sub-networks or components that are at most in operation at the same time, the total capacitance of the Y-capacitors in all components of the on-board network can advantageously be made larger than in an on-board network, in which all components are connected to the energy storage device at the same time or permanently. Because only a subset of the sub-networks or components is connected to the energy storage device in each of the operating states of the motor vehicle, the permissible total capacitance can nevertheless advantageously be maintained in each of the operating states.

The filter device can in particular be an input-side filter device of the component. The input of the component is understood to be the side of the component at which the voltage generated by the energy storage device drops. In this case, however, this does not preclude that the component, for example a bidirectional DC voltage converter or an electrical machine in a generator mode, can also deliver power to the energy storage device.

The operating state information can be ascertained by the control device itself or it can be transmitted to it from another control unit, for example a control unit of a motor vehicle comprising the on-board network. The operating states can advantageously be selected in particular in such a way that function groups or clusters are formed from components which are assigned to certain functions or operating states of the motor vehicle. The on-board network of the motor vehicle can in particular be a high-voltage on-board network in which electromagnetic interference can arise due to switching processes, for example of a traction converter or other power electronics elements.

According to the invention it can be provided that at least one input of each of the components can be de-energized by the switching devices. In this way, in particular, a filter device present in the component on the input side, such as an EMC filter for filtering interference occurring in the on-board network, is also completely disconnected from the energy storage device or separated from the remaining part of the on-board network when the component or the components of the sub-network are not required in the present operating state. This advantageously reduces the total capacitance, which is still connected to the energy storage device in the operating state, generated by the connected filter devices.

According to the invention it can be provided that the switching devices are embodied as separate devices from the components. The switching devices can be connected to the input of the component or the inputs of multiple components of a sub-network and/or the energy storage device, for example, via electrical connection means such as cables or busbars. The switching devices can be arranged, for example, in or on a housing of the energy storage device.

According to the invention, the switching devices can each comprise at least one switching element, in particular a semiconductor switch and/or a contactor. A transistor, for example, can be used as the semiconductor switch. This enables a sufficiently good current carrying capacity of the switching devices when the switching elements are closed, so that the components arranged in the respective sub-networks can be reliably energized.

According to the invention it can be provided that the energy storage device has two poles, wherein the connections to both poles can each be interrupted by the switching devices for each sub-network or wherein the connection to one of the poles can be interrupted by the switching devices for at least two of the sub-networks and the connection between the other pole and the at least two sub-networks can be interrupted by a further switching device.

For example, a switching element can be arranged between the two poles of the energy storage device and the sub-network in the connections of each sub-network to the energy storage device, so that the connections to a positive pole and a negative pole can be separated individually for each sub-network. It is also possible that one switching device is provided for each of the sub-networks or for at least two of the sub-networks only in the connection to one of the poles, for example the positive pole, wherein a common further switching device is provided for disconnecting the connections to the further pole of the energy storage device. The individual sub-networks can thus be disconnected separately by opening the connection to one of the poles by the switching device assigned to the respective sub-network, wherein it is possible to completely disconnect all components by additionally opening the further switching device. The further switching device or the switching element of the further switching device can also be referred to as the main separating element. It is possible that, even when using a switching element, one or two main separating elements are provided in each connection between the poles of the energy storage device and each of the sub-networks, which can additionally separate one or both poles of the energy storage device from the switching devices which are assigned to the respective sub-networks.

According to the invention, it can be provided that the control device is configured to activate the switching devices as a function of the operating state information in the event of multiple present operating states in such a way that each of the sub-networks are connected to the energy storage device which comprise a component assigned to at least one of the multiple present operating states, and the sub-networks which do not comprise a component assigned to at least one of the multiple present operating states, are separated from the energy storage device. In the event of multiple present operating states, for example, in a driving mode and a simultaneous air conditioning mode or the like, it is sufficient if the at least one component of a sub-network is assigned to one of the multiple present operating states in order to establish a connection between the energy storage device and the corresponding component or its sub-network. Correspondingly, in the case of multiple present operating states, those components or those sub-networks are separated from the energy storage device which are not assigned to any of the present operating states, therefore the components which are not required in the present operating states of the motor vehicle.

In one preferred embodiment of the invention, it can be provided that components which are assigned to a driving operating state, a DC charging operating state, an AC charging operating state, a low-voltage on-board network supply operating state, a heating operating state, an air conditioning operating state, a chassis control operating state, and/or an exhaust gas treatment operating state, are each arranged in a separate sub-network. Correspondingly, the operating state information can describe a driving operating state, a DC charging operating state, an AC charging operating state, a supply operating state of a low-voltage on-board network, a heating operating state, and/or an air conditioning operating state as operating states.

According to the invention it can be provided that at least one component designed as a traction electric motor is assigned to the driving operating state, at least one component designed as a DC charging device is assigned to the DC charging operating state, at least one component designed as an AC charging device is assigned to the AC charging operating state, at least one component designed as a DC voltage converter is assigned to the low voltage on-board network supply operating state, at least one component designed as a heater is assigned to the heating operating state, at least one component designed as an air conditioner is assigned to the air conditioning operating state, a component designed as a chassis device is assigned to the chassis control operating state, and/or a component designed as an exhaust gas treatment device is assigned to the exhaust gas treatment operating state.

Such a division of the components enables the formation of different sub-networks or the assignment of the components to operating states in such a way that no simultaneous operation of all sub-networks takes place. For example, an AC charging device and a DC charging device are not required at the same time to charge the energy storage device. Furthermore, for example, at the same time as a DC charging device and/or an AC charging device, one or more traction electric motors of the on-board network or of a motor vehicle having the on-board network are not required, since a motor vehicle designed as an electric vehicle is usually charged while stationary. A component designed as a DC voltage converter, which is designed to supply a low-voltage on-board network in the low-voltage on-board network supply mode, can, for example, convert the voltage of the energy storage device to a voltage level of, for example, 12 V, 24 V, or 48 V. Depending on the voltage level, the low-voltage on-board network can also be referred to as a medium-voltage on-board network (MV on-board network).

According to the invention, it can be provided that the on-board network is a high-voltage on-board network, in particular having a voltage of 60 V or greater. For example, the voltage of the high-voltage vehicle electrical system can be between 200 V and 1500 V. The energy storage device can be, for example, a traction energy storage device such as a traction battery, by means of which, for example, at least one component of the on-board network, which is designed as a traction electric motor, is operable.

A motor vehicle according to the invention is intended to comprise an on-board network according to the invention. All statements relating to the on-board network according to the invention also apply accordingly to the motor vehicle according to the invention.

For a method according to the invention for operating an on-board network, it is provided that the on-board network comprises a control device, an energy storage device, and multiple components operable via the energy storage device, wherein the on-board network is divided into at least two sub-networks and the sub-networks each comprise at least one of the components, wherein the components of different sub-networks are each assigned to at least one different operating state of the motor vehicle, wherein each of the sub-networks can be separated from the energy storage device via at least one switching device, wherein the control device activates the switching devices as a function of operating state information describing at least one present operating state of the motor vehicle in such a way that each of the sub-networks, which include a component assigned to the present operating state, are connected to the energy storage device and the sub-networks, which do not comprise a component assigned to the present operating state, are separated from the energy storage device.

According to the invention, it can be provided that the control device is configured to activate the switching devices as a function of the operating state information in the case of multiple present operating states in such a way that each of the sub-networks, which comprise a component assigned to at least one of the multiple present operating states, are connected to the energy storage device, and the sub-networks, which do not comprise a component assigned to at least one of the multiple present operating states, are separated from the energy storage device.

All advantages and embodiments described above with reference to the on-board system according to the invention or the motor vehicle according to the invention also apply accordingly to the method according to the invention and vice versa.

BRIEF DESCRIPTION OF THE FIGURES

Further advantages and details of the invention result from the exemplary embodiments described hereinafter and on the basis of the drawings. In the schematic illustrations of the figures.

DETAILED DESCRIPTION

Figure 1:
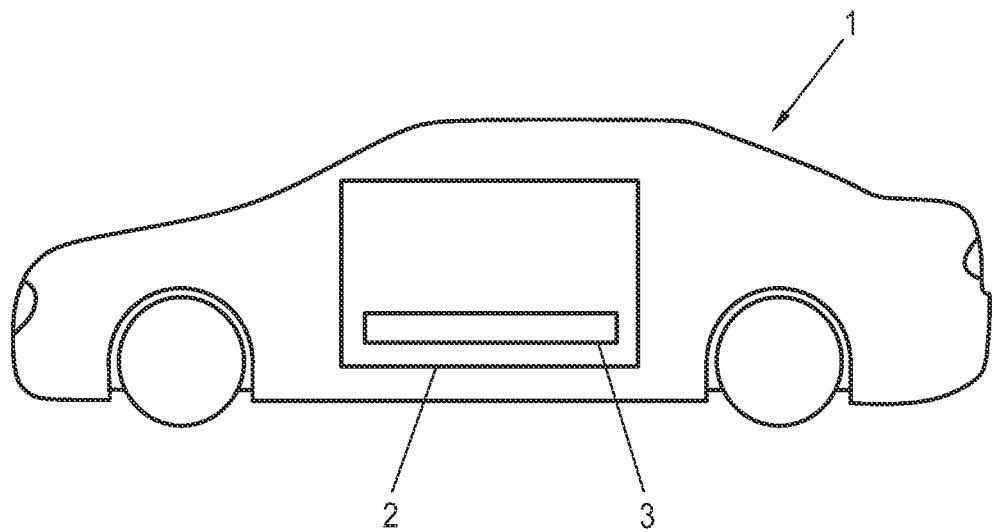
FIG. 1 shows a schematic side view of a motor vehicle according to the invention.

FIG. 1 shows a schematic side view of a motor vehicle 1. The motor vehicle 1 includes an on-board network 2, which includes an energy storage device 3. The on-board network 2 is used to distribute electrical energy in the motor vehicle 1 that can be drawn from the energy storage device 3. The energy storage device 3 is a high-voltage energy storage device, which is also used as a traction energy storage device of the motor vehicle 1. The energy storage device 3 can, for example, be designed as a battery and can comprise multiple battery cells connected in parallel and/or in series.

Figure 2:
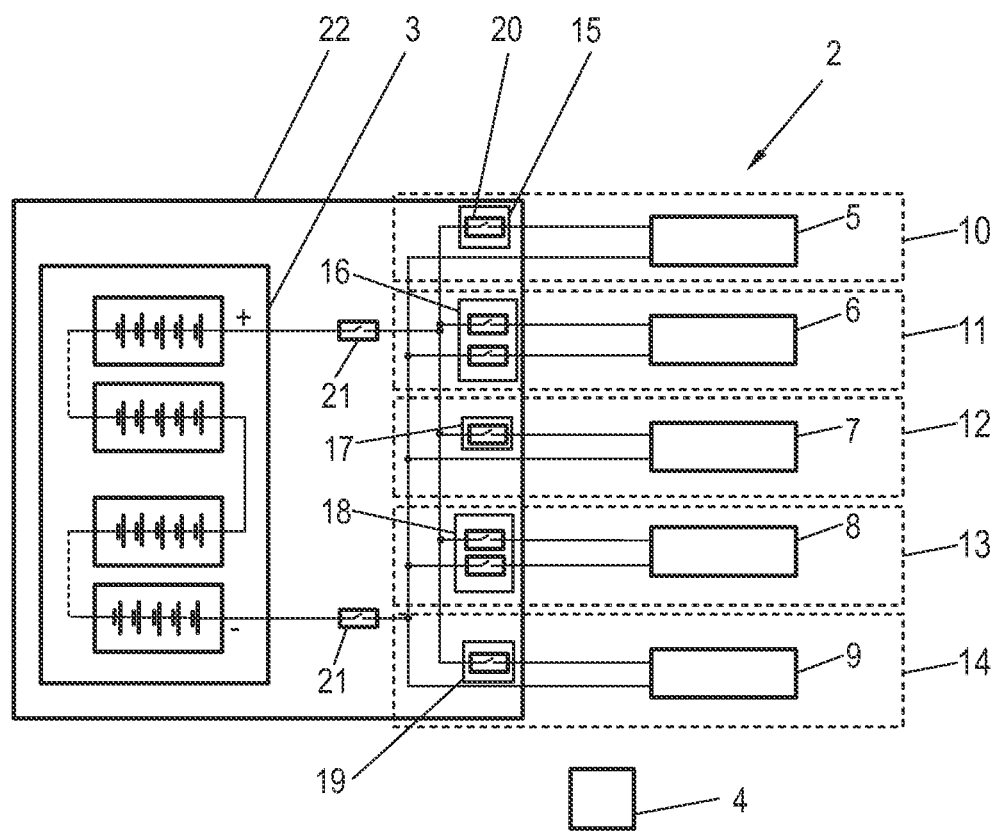
FIG. 2 shows a first exemplary embodiment of an on-board network according to the invention.

FIG. 2 shows a first exemplary embodiment of the on-board network 2. In addition to the energy storage device 3, the on-board network 2 comprises a control device 4 and multiple components 5-9 operable via the energy storage device 3. In the present exemplary embodiment, the on-board network 2 is divided into five sub-networks 10-14, wherein each of the sub-networks comprises one of the components 5-9. The components 5-9 of the sub-networks 10-14 can each be separated from the energy storage device 3 via at least one switching device 15-19.

The switching devices 15-19 each comprise at least one switching element 20, by means of which the connection of the assigned sub-network 10-14 to one pole of the energy storage device 3 or to both poles of the energy storage device 3 can be separated. Two main separating elements 21 are also provided, via which the energy storage device 3 can additionally be separated from the switching devices 15-19 and thus from the components 5-9 or the entire sub-networks 10-14. The main separating elements 21 are also each designed as switching elements. The switching elements 20 of the switching devices 15-19 and/or the main separating elements 21 can each, for example, be designed as a semi-conductor switch, in particular as a transistor, and/or as a contactor. The main separating elements 21 as well as the switching devices 15-19 and the energy storage device 3 can be arranged in a common housing 22 of the energy storage device 3.

By means of the switching devices 15-19, the inputs of the components 5-9 can each be de-energized by opening the at least one switching element 20 of each of the switching devices 15-19. The switching devices 15, 17, and 19 each comprise one switching element 20, so that the connection between a positive pole of the energy storage device 3 and the input of each of the components 5, 7 and 9 can be interrupted. The switching devices 16 and 18 each comprise two switching elements 20, so that each of the connections between a positive pole and a negative pole of the energy storage device 3 and the input of the components 6 and 8 can be interrupted.

The components 5-9, which are each arranged in the separate sub-networks 10-14, are each assigned to at least one different operating state of the motor vehicle 1. The component 5 is designed, for example, as an air conditioner and is assigned to an air conditioning state of the motor vehicle 1. The component 6 is designed as a traction electric motor and is assigned to a driving operating state of the motor vehicle 1. The component 7 is designed as a DC voltage converter and is assigned to a low-voltage on-board network supply operating state of the motor vehicle 1. The component 8 is designed as a DC charging device and is accordingly assigned to a DC charging operating state of the motor vehicle 1. The component 9 is designed as an AC charging device and is assigned to an AC charging operating state of the motor vehicle 1.

Depending on the at least one present operating state of the motor vehicle 1, not all of the components 5-9 are required at the same time. For example, in a DC charging operating state in which the energy storage device 3 is charged via a DC source, for example, only the component 7 designed as a DC voltage converter for supplying a low-voltage on-board electrical system and the component 8 designed as a DC charging device are required. Since the motor vehicle does not move in a charging operating state, the component 6 designed as a traction electric motor, for example, is not required there. It is also possible that in the charging operating state, for example, the component 5 designed as an air conditioner is also not required. Furthermore, in the DC charging operating state, the component 9, which is designed as an AC charging device, is also not required.

A further example is a driving operating state of the motor vehicle 1, in which the component 8 designed as a traction electric motor is required. Furthermore, in addition to the driving operating state for operating low-voltage components, a low-voltage on-board network supply operating state can be present, for which component 7, which is designed as a DC voltage converter, is operated. In addition, there can be an air-conditioning operating state in which the component 5 designed as an air conditioner is used. Since it is not possible to charge the motor vehicle while driving, the components 8 and 9 designed as charging devices are not required, so that they can be switched off by disconnecting the sub-networks 13 and 14 and de-energized at least on the input side.

Another example is represented by stationary air conditioning of the motor vehicle 1, in which the component 8 designed as a traction electric motor is required. In addition, for example, the charging operating state can be present when the motor vehicle is being charged while stationary and/or the low-voltage on-board network supply operating state can be present, for example, when a multimedia device of the motor vehicle operated via the low-voltage on-board network is used.

In addition to these examples, other operating states or combinations of operating states are possible in which only some of the components 5-9 are required. The components 5-9 that are not required in each case or the sub-networks 10-14 are each separated from the energy storage device via the switching devices 15-19 and de-energized at least on the input side. The assignment of the existing components to the possible operating states as well as the respective operating states taken into consideration can depend in particular on the type and/or design of the motor vehicle 1.

The present operating state or the present operating states of the motor vehicle are described by operating state information which is available to the control device 4. The control device 4 can determine the operating state information itself or it can be transmitted to the control device 4 by a further control unit (not shown) of the motor vehicle 1. The control device 4 activates the switching devices 15-19 in a method for operating the on-board network 2 as a function of the operating state information in order to separate the components not required for the at least one present operating state from the energy storage device 3. The switching devices 15-19 are activated by the control device 4 in such a way that the sub-networks 10-14, which comprise a component 5-9 assigned to the present operating state, are each connected to the energy storage device 3, and the sub-networks 10-14, which do not comprise a component 5-9 assigned to the present operating state, are separated from the energy storage device 3. The connections between the control device 4 and the switching devices 15-19 are not shown in FIG. 2 for the sake of clarity.

In the case of operating state information which describes more than one present operating state, for example, a driving operating state of the motor vehicle 1 and an air conditioning operating state of the motor vehicle 1, the components 5-9, which are assigned to at least one of the operating states, are each operated by connecting the respective sub-networks 10-14 to the energy storage device 3. The components 5-9, which are not assigned to any of the present operating states, are separated from the energy storage device 3 by appropriate activation of the switching elements 15-19.

The present illustration of components 5-9 and the sub-networks 10-14 in the on-board network 2 is not exhaustive. The on-board network 2 can in particular comprise further components, for example, components designed as heating elements, which are assigned to a heating operating state of the motor vehicle, as chassis devices, which are assigned to a chassis control operating state, and/or as exhaust gas treatment devices, which are assigned to an exhaust gas treatment operating state. The components can in particular be arranged in one or more sub-networks, wherein the sub-network or sub-networks are each connected to the energy storage device 3 via a switching device, so that the other components can also be connected to or separated from the energy storage device 3 depending on the operating state information. A chassis control operating state can exist, for example, when adaptive chassis control is activated, and an exhaust gas treatment operating state can exist, for example, when the motor vehicle 1 comprises an internal combustion engine and this is in operation.

The on-board network 2 can be, for example, a high-voltage on-board network, in particular having a DC voltage of 60 V or greater, wherein the high voltage in the on-board network 2 is provided by the energy storage device 3. The voltage of the high-voltage on-board network can be, for example, 200 V, 400 V, 800 V, 1000 V, or 1500 V. A component 7 designed as a DC voltage converter can be used, for example, for the supply of a low-voltage on-board network with a voltage between 12 V and 48 V, which can also be referred to as a medium-voltage on-board network.

By means of the main separating elements 21, the energy storage device 3 can be separated from all sub-networks 10-14, for example, when the motor vehicle 1 is switched off or turned off. For some of the components, such as component 6 designed as a traction electric motor and/or for component 8 designed as a DC charging device, two switching elements 20 can be provided for each of the switching devices 16 or 18 for safety reasons, so that both a connection to a positive pole of the energy storage device 3 and to a negative pole of the energy storage device 3 can each be separated separately. For other components, in the present case for the components 5, 7, 9, it can be sufficient if only the connection to the positive pole of the energy storage device 3 is separated by the individual switching element 20.

The inputs of the components 5-9 are also de-energized by the switching devices 15-19, so that the voltage of the energy storage device 3 no longer drops across the inputs of the components 5-9. This reduces the operating hours of the individual components 5-9, since these are also only connected to the energy storage device 3 on the input side when the present operating state of the motor vehicle 1 requires this.

By dividing the components 5-9 into the individual sub-networks 10-14 or assigning the components 5-9 to the individual operating states of the motor vehicle 1, in the various operating states of the motor vehicle 1, the number of the components 5-9 in operation at the same time is advantageously less than the total number of components 5-9 of the on-board network 2. In this way, a total capacitance, which is provided for the filter devices arranged, for example, on the input side in components 5-9, can be divided between each of a subset of components 5-9. This increases the proportion of the total capacitance available per component. This enables larger capacitances to be used in the filter devices, which are designed, for example, as EMC filters, and the inductances in the filter devices can be reduced accordingly. This advantageously reduces the installation space requirement as well as the costs and the weight of the filter devices in the components 5-9.

Figure 3:
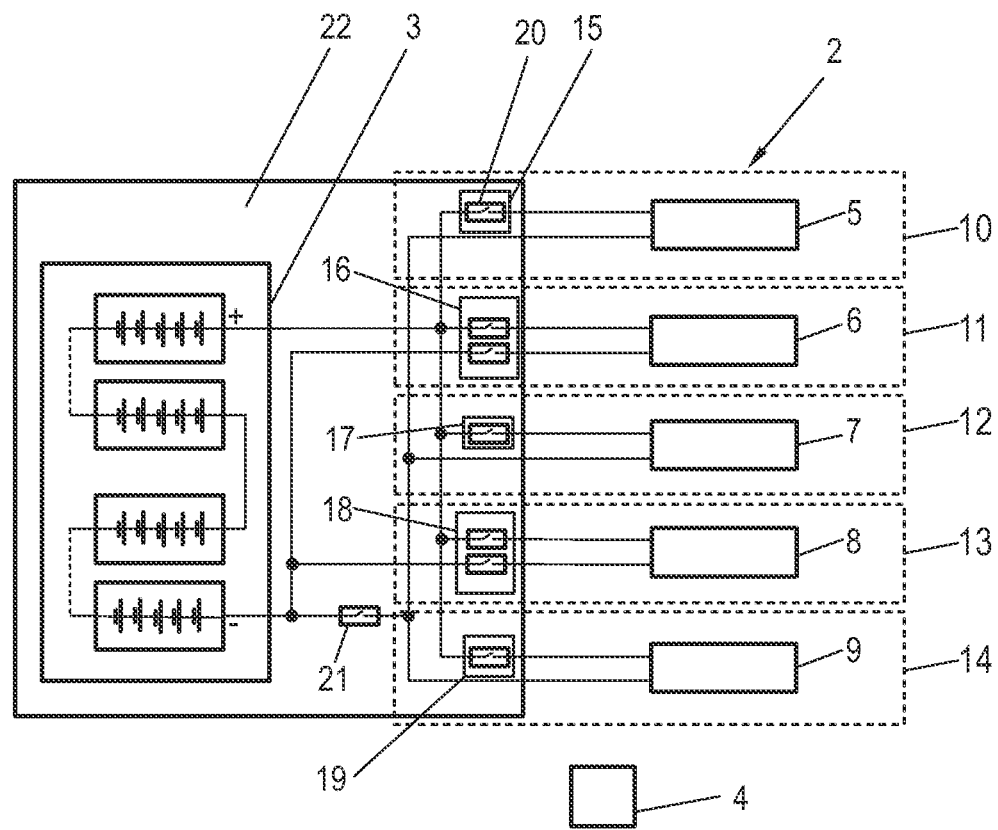
FIG. 3 shows a second exemplary embodiment of an on-board network according to the invention.

FIG. 3 shows a second exemplary embodiment of an on-board network 2. With regard to the energy storage device 3, the control device 4, the components 5-9 and the sub-networks 10-14, this corresponds to the first exemplary embodiment of the on-board network 2. One difference is that the on-board network 2 has only a single main separating element 21, which can separate the negative pole of the energy storage device 3 from all sub-networks 10-14. Since a switching element 20 is provided as part of the switching devices 15-19 for each of the sub-networks 10-14, a main separating element, which separates the positive pole of the energy storage device 3 from the sub-networks 10-14 or the components 5-9, can advantageously be dispensed with, since the separation can also be separated by the respective switching elements 20 of the switching device 15-19 that are integrated into the positive path.

The invention claimed is:

1. A high-voltage system for a motor vehicle comprising:
a control device,
an energy storage device, and
a plurality of components operable via the energy storage device, the plurality of components comprising at least two of: a traction electric motor, a DC charging device, an AC charging device, at DC voltage converter, a heater, an air conditioner, a chassis device, and an exhaust gas treatment device,
wherein the high-voltage system is divided into a plurality of sub-networks, each sub-network comprising at least one of the plurality of components and an EMC filter device specific to the at least one of the plurality of components, both of which are connected to the energy storage device via at least one switching element distinct to the sub-network, such that each of the plurality of sub-networks can be individually connected to and disconnected from the energy storage device,
wherein each of the plurality of sub-networks are assigned to at least one of a plurality of operating states of the motor vehicle, and
wherein the control device is configured to control a switching state of the at least one switching element of each of the plurality of sub-networks based on a present operating state of the motor vehicle, such that those of the plurality of sub-networks with an assignment corresponding to the present operating state are connected to the energy storage device and those of the plurality of sub-networks with an assignment that does not correspond to the present operating state are disconnected from the energy storage device.

2. The high-voltage system according to claim 1, wherein the switching elements are designed as devices separate from the components.

3. The high-voltage system according to claim 2, wherein each of the at least one switching elements de-energize at least one pole of the components in the respective sub-network.

4. The high-voltage system according to claim 2, wherein one or more of the at least one switching elements de-energize both poles of the components in the respective sub-network.

5. The high-voltage system according to claim 1, wherein the energy storage device is connected to one or more of the plurality of sub-networks via at least one separating element, each of the at least one separating element assigned to a respective pole of the energy storage device.

6. The high-voltage system according to claim 1, wherein the switching devices each comprise at least one switching element designed as a semiconductor switch and/or a contactor.

7. The high-voltage system according to claim 1, wherein the plurality of operating states comprises at least two of: a DC charging operating state, an AC charging operating state, a low-voltage on-board network supply operating state, a heating operating state, an air conditioning operating state, a chassis control operating state, and an exhaust gas treatment operating state.

8. The high-voltage system according to claim 1, wherein the high-voltage system has a voltage of 60V or greater.

9. A motor vehicle comprising the high-voltage system according to claim 1.

10. The high-voltage system according to claim 1, wherein the plurality of sub-networks is at least three sub-networks.

11. The high-voltage system according to claim 1, wherein the control device is configured such that multiple of the plurality of operating states may prevail simultaneously.

12. A method for operating a high-voltage system of a motor vehicle,
   wherein the high-voltage system comprises a control device, an energy storage device, and a plurality of components operable via the energy storage device,
   wherein the plurality of components comprises at least two of: a traction electric motor, a DC charging device, an AC charging device, at DC voltage converter, a heater, an air conditioner, a chassis device, and an exhaust gas treatment device,
   wherein the high-voltage system is divided into a plurality of sub-networks, each sub-network comprising at least one of the plurality of components and an EMC filter device specific to the at least one of the plurality of components, both of which are connected to the energy storage device via at least one switching element distinct to the sub-network, such that each of the plurality of sub-networks can be individually connected to and disconnected from the energy storage device, and
   wherein each of the plurality of sub-networks are assigned to at least one of a plurality of operating states of the motor vehicle,
   the method comprising:
   controlling a switching state of the at least one switching element of each of the plurality of sub-networks based on a present operating state of the motor vehicle, such that those of the plurality of sub-networks with an assignment corresponding to the present operating state are connected to the energy storage device and those of the plurality of sub-networks with an assignment that does not correspond to the present operating state are disconnected from the energy storage device.

* * * * *